United States Patent [19]

Dichter

[11] Patent Number: 4,832,726
[45] Date of Patent: May 23, 1989

[54] HOLDING CHUCK FOR GLASS-WORKING MACHINES

[76] Inventor: Hans-Joachim Dichter, Sachsendamm 93, 1000 Berlin 62, Fed. Rep. of Germany

[21] Appl. No.: 148,657

[22] PCT Filed: Apr. 15, 1987

[86] PCT No.: PCT/DE87/00176
§ 371 Date: Dec. 7, 1987
§ 102(e) Date: Dec. 7, 1987

[87] PCT Pub. No.: WO87/06222
PCT Pub. Date: Oct. 22, 1987

[30] Foreign Application Priority Data
Apr. 17, 1986 [DE] Fed. Rep. of Germany ....... 3613210

[51] Int. Cl.[4] .............................................. C03B 23/11
[52] U.S. Cl. ....................................... 65/272; 65/280; 65/292
[58] Field of Search ................... 65/108, 272, 278–280, 65/292

[56] References Cited

U.S. PATENT DOCUMENTS

| | | | |
|---|---|---|---|
| 3,137,557 | 6/1964 | Hobin | 65/280 |
| 3,792,991 | 2/1974 | Couguelet | 65/280 X |
| 4,142,883 | 3/1979 | Dichter | 65/280 X |
| 4,330,317 | 5/1982 | Vertova | 65/272 X |

FOREIGN PATENT DOCUMENTS

| | | |
|---|---|---|
| 676625 | 5/1939 | Fed. Rep. of Germany . |
| 736482 | 5/1943 | Fed. Rep. of Germany . |
| 916954 | 12/1946 | France . |
| 2170134 | 9/1973 | France . |

OTHER PUBLICATIONS

*Patent Abstracts of Japan*, vol. 9, No. 287, Nov. 14, 1985, and JP,A, 60131836, Jul. 13, 1985.

Primary Examiner—Robert L. Lindsay
Attorney, Agent, or Firm—Mark P. Stone

[57] ABSTRACT

In a holding chuck (3) for tubes of glass-working machines, clamping jaws (7) which are guided in a basic body (5) and have, at their ends, plates (9) provided with a bore for receiving a ball (12) are used. Each ball is guided in a bore (14) in a thrust ring (13), whilst the plates (9) are additionally guided in slots (15) of the thrust ring (13).

4 Claims, 1 Drawing Sheet

HOLDING CHUCK FOR GLASS-WORKING MACHINES

BACKGROUND OF THE INVENTION

The invention relates to a holding chuck for glass-working machines which can be fed with tubes and which are intended for producing small bottles, ampoules or the like, with several clamping jaws which are guided in a basic body and can be shifted to and fro by means of an actuating lever acting on a thrust ring, and which have, their ends facing away from the clamping surfaces, engagement means guided in slots in the thrust ring.

German Patent Specification No. 676,625 makes known holding chucks of the type in question, in which the slots in the thrust rings are formed by encircling grooves, into which engage projections arranged at the ends of the clamping jaws and formed either by parts of the clamping jaws themsleves or by crosspins fastened to the clamping-jaw ends. The known solutions are not entirely satisfactory, inasmuch as both the outlay involved in producing the chuck and that necessary for adjusting its clamping jaws are comparatively high, and they lack possibilities of compensating the play of the clamping-jaw guides after a lengthy period of use.

SUMMARY OF THE INVENTION

The objection on which the invention is based is to provide a holding chuck of the type in question, of which the clamping jaws or clamping-jaw guides can be produced and adjusted in a simple way with great accuracy. According to the invention, this object is achieved because the engagement means for the clamping jaws are formed by balls which, on the one hand, are guided in cylindrical bores of a diameter matching them in the thrust ring and, on the other hand, are held in bores of the same diameter, extending perpendicularly relative to the axis of the first bores, at the ends of the clamping jaws which are narrower in relation to the ball diameter.

BRIEF DESCRIPTON OF THE DRAWINGS

A preferred exemplary embodiment of a holding chuck characterized by simplicity and good guide properties is explained in detail below with reference to the accompanying drawing. In the drawing.

DESCRIPTION OF THE BEST MODES FOR CARRYING OUT THE INVENTION

Figure 1:
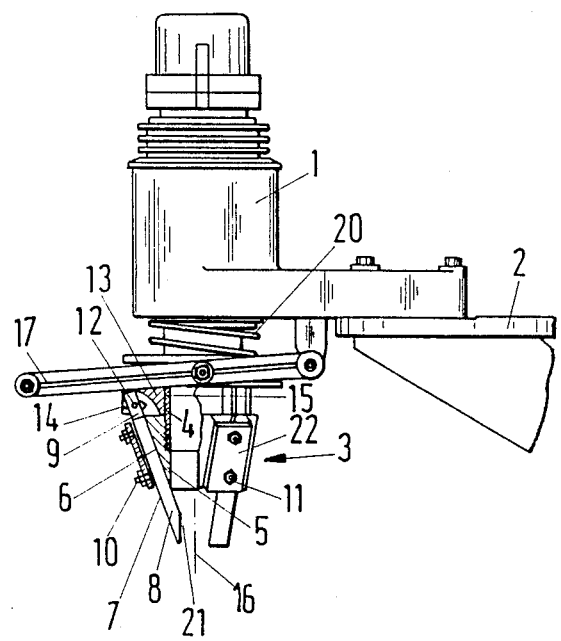
FIG. 1 shows a side view of a holding chuck, partially in section.
Figure 2:
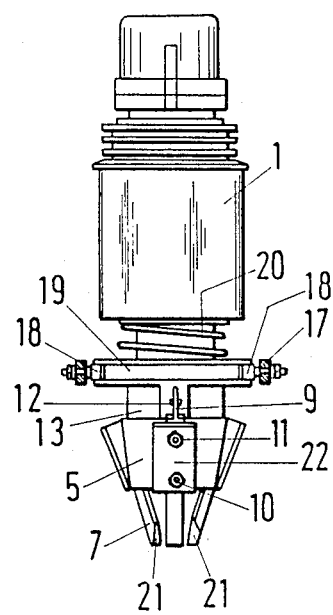
FIG. 2 shows the end view of the holding chuck according to FIG. 1.
Figure 3:
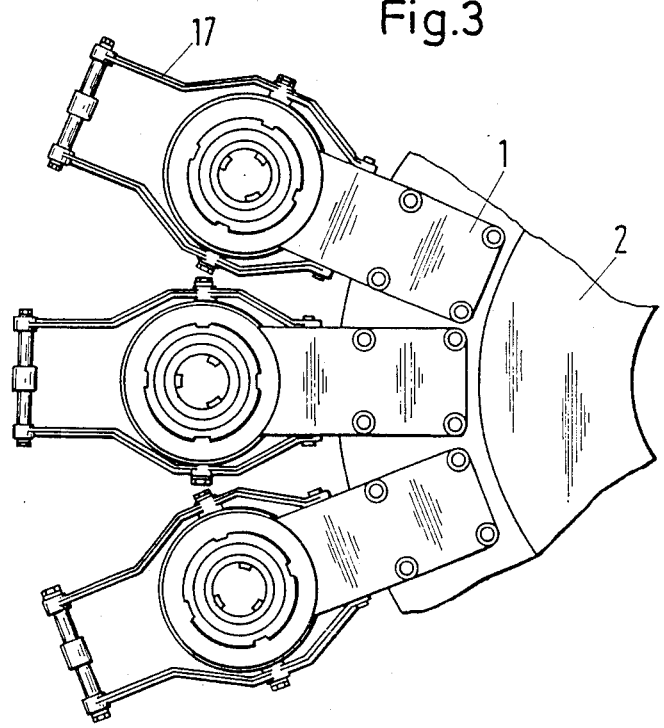
FIG. 3 shows a top view of three holding chucks of a glassworking machine equipped with a plurality of holding chucks.

In the Figures, 1 denotes an extension arm which is fastened to a revolving mount 2 of a glass-working machine and which carries a holding chuck, designated as a whole, by 3, for a glass tube or a tube made of another thermoplastically deformable material. The holding chuck includes a basic body 5 screwed to a tube 4 and equpped with guides 6 for three clamping jaws 7. The clamping jaws 7 have a guide part 8 of essentially triangular cross-section and a plate 9 of rectangular cross-section. The guide parts 8 of the clamping jaws 7 are mounted free of play in their guides. In order to preserve the freedom from play, headless setscrews 10, the position of which is secured by means of lock nuts 11, are used. The plates 9 are provided with transverse bores which form a cage for a ball 12. The plates 9 and the balls 12 are guided in a thrust ring 13 serving for actuating the clamping jaws. This thrust ring 13 is provided, on the one hand, with bores 14 for the balls 12 and, on the other hand, with slots 15 for the plates 9. An actuating lever 17 serves for subjecting the thrust ring 13 to an up-and-down movement in the direction of the longitudinal axis 16 of the holding chuck. The actuating lever 17 carries two rotatably mounted bolts 18 which engage into an annular groove 19 in the thrust ring 13. A spring 20 presses the thrust ring 13 into the position shown in FIGS. 1 and 2.

When the machine is in operation, the tube 4, the thrust ring 13 and the basic body 5 equipped with the clamping jaws 7 rotate. The spring 20 presses the clamping surfaces 21 of the clamping jaws up against a gripped tube not shown in the drawing. It is not possible for the clamping jaws 7 to rotate because of their essentially triangular shape. When the actuating lever 17 is moved upwards counter to the force of the spring 20 in FIGS. 1 and 2, it takes the thrust ring 13 with it via the bolts 18 and the annular groove 19. Consequently, the thrust ring 13 changes its axial position on the tube 4 in relation to the basic body 5. At the same time, the clamping jaws 7 are moved obliquely upwards in their guides 6, and the clamping surfaces 21 release the particular tube.

The use of conventional balls 12 for guiding the plates 9 of the clamping jaws in the bores 14 makes it possible to ensure highly accurate play-free guidance by simple means. It is also simple to produce the guides 6 for the guide parts 8 of the clamping jaws 7. The guides 6 are cut in the basic body 5 by milling and are covered with a cover 22 which receives the headless setscrews 10.

I claim:

1. A holding chuck (3) for holding tubes in a glass-working machine, in which machine sections of each tube are successively transformed into small bottles, ampoules or other glass containers, said chuck comprising several clamping jaws (7) which are guided in guides (6) of a basic body (5) and can be shifted to and fro by means of an actuating lever (17) acting on a thrust ring (13), and which have, at their ends facing away from their clamping surfaces, engagement means guided in slots in the thrust ring (13), said engagement means for each clamping jaw (7) being formed by a ball (12) which is guided in a cylindrical bore 14 of matching diameter in the thrust ring (13) and is held in an additional bore of the same diameter, extending perpendicularly relative to the axis of the bore (14) in the thrust ring (13), said additional bores being defined in ends of the clamping jaws which are narrower than the ball diameter.

2. A holding chuck as claimed in claim 1, wherein those ends of the clamping jaws (7) which hold the balls (12) in the additional bores are formed by plates (9) guided in slots (15) in the thrust ring (13).

3. A holding chuck as claimed in claim 2, wherein the plates (9) of the clamping jaws (7) have adjoining them a guide part (8) of essentially triangular cross-section, the vertex of which is directed towards the longitudinal axis (16) of the holding chuck (3).

4. A holding chuck as claimed in claim 3, wherein the guide parts (8) of the clamping jaws (7) are guided in guides (6) of the basic body (5) which are equipped with headless setscrews (10) serving for compensating the play and pressing against the back of the guide parts (8).

* * * * *